(12) United States Patent
Kawakami

(10) Patent No.: US 7,882,763 B2  
(45) Date of Patent: Feb. 8, 2011

(54) SHIFT CONTROL DEVICE FOR A BICYCLE TRANSMISSION

(75) Inventor: Tatsuya Kawakami, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 1660 days.

(21) Appl. No.: 10/710,610

(22) Filed: Jul. 23, 2004

(65) Prior Publication Data  
US 2006/0016288 A1   Jan. 26, 2006

(51) Int. Cl.  
F16C 1/10 (2006.01)

(52) U.S. Cl. ..................................... 74/502.2
(58) Field of Classification Search ............... 74/500.5, 74/501.6, 502.2, 527  
See application file for complete search history.

(56) References Cited

U.S. PATENT DOCUMENTS

| | | | |
|---|---|---|---|
| 3,800,614 A | 4/1974 | Johnson | |
| 4,504,250 A | 3/1985 | Juy | |
| 4,532,825 A | 8/1985 | Nagano | |
| 4,864,885 A | 9/1989 | Nagano | |
| 4,995,280 A | 2/1991 | Tagawa | |
| 5,012,692 A | 5/1991 | Nagano | |
| 5,044,213 A | 9/1991 | Nagano | |
| 5,052,241 A | 10/1991 | Nagano | |
| 5,094,120 A | 3/1992 | Tagawa | |
| 5,095,768 A | 3/1992 | Nagano | |
| 5,104,358 A * | 4/1992 | Kobayashi | 474/82 |
| 5,191,807 A | 3/1993 | Hsu | |
| 5,203,213 A | 4/1993 | Nagano | |
| 5,213,005 A | 5/1993 | Nagano | |
| 5,222,412 A | 6/1993 | Nagano | |
| 5,241,878 A | 9/1993 | Nagano | |
| 5,355,745 A * | 10/1994 | Wu et al. | 74/502.2 |
| 5,400,675 A | 3/1995 | Nagano | |
| 5,609,064 A | 3/1997 | Abe | |
| 5,617,761 A | 4/1997 | Kawakami | |
| 5,673,594 A | 10/1997 | Huang et al. | |
| 5,732,593 A | 3/1998 | Hwang et al. | |
| 5,768,945 A * | 6/1998 | Ose | 74/489 |
| 5,791,195 A | 8/1998 | Campagnolo | |

(Continued)

FOREIGN PATENT DOCUMENTS

CH           238434 A     7/1945

(Continued)

OTHER PUBLICATIONS

European Search Report for EP 05009121.4, the European application that corresponds to this application, dated Jan. 28, 2009.

Primary Examiner—Vicky A Johnson  
(74) Attorney, Agent, or Firm—James A. Deland

(57) ABSTRACT

A shift control device for a bicycle transmission comprises a mounting member adapted to mount the shift control device to a bicycle; a first lever operatively coupled to the mounting member such that the first lever stops at a plurality of positions corresponding to gear positions of the bicycle transmission, wherein the first lever moves in a first plane; and a second lever operatively coupled to the mounting member for movement in a second plane between a rest position and an operating position such that the second lever returns to the rest position after moving to the operating position. In this embodiment, the first plane is substantially parallel to the second plane.

78 Claims, 6 Drawing Sheets

U.S. PATENT DOCUMENTS

| | | |
|---|---|---|
| 5,799,542 A | 9/1998 | Yamane |
| 5,829,313 A | 11/1998 | Shahana |
| 5,921,138 A | 7/1999 | Kojima et al. |
| 5,957,002 A | 9/1999 | Ueng |
| 6,155,132 A | 12/2000 | Yamane |
| 6,397,700 B1 | 6/2002 | Liu et al. |
| 6,497,163 B2 | 12/2002 | Liu et al. |
| 6,527,095 B2 | 3/2003 | Assel |
| 6,553,860 B2 | 4/2003 | Blaschke |
| 6,810,764 B2 * | 11/2004 | Chen .......................... 74/502.2 |
| 6,880,425 B2 * | 4/2005 | Shahana .................... 74/502.2 |
| 7,194,931 B2 * | 3/2007 | Wessel ................... 74/577 M |
| 2001/0042421 A1 | 11/2001 | Feng et al. |
| 2002/0124678 A1 | 9/2002 | Chen |
| 2004/0025621 A1 * | 2/2004 | Chen .......................... 74/502.2 |

FOREIGN PATENT DOCUMENTS

| | | |
|---|---|---|
| DE | 19642907 A1 | 4/1997 |
| DE | 10213450 A1 | 10/2003 |
| GB | 2012893 A | 8/1979 |
| JP | 58-118483 | 7/1983 |
| JP | 59-43191 | 12/1984 |
| JP | 60-149485 | 10/1985 |

* cited by examiner the wire spooling device, and the second lever is moved from a rest position to an operating position to unwind the transmission control wire from the wire spooling device. The wire spooling device comprises a cylindrical wire spooling member having a wire winding groove for winding and unwinding the transmission control wire, a plurality of drive teeth circumferentially disposed around the outer peripheral surface of the wire spooling member, and a plurality of positioning teeth also circumferentially disposed around the outer peripheral surface of the wire spooling member. The wire spooling member is biased in a wire unwinding direction by a spring. A drive pawl is mounted to the first lever for pressing against one of the plurality of drive teeth in response to rotation of the first lever from the rest position to the operating position to thereby rotate the wire spooling member in a wire winding direction, and a positioning pawl selectively engages one of the positioning teeth to hold the wire spooling member in a desired rotational position. The second lever is operated from the rest position to the operating position to selectively engage and disengage the positioning pawl to allow the spooling member to rotate in the wire unwinding direction in accordance with the biasing force of the spring.

Another type of shift control device shown in U.S. Pat. No. 5,094,120, for example, also comprises first and second levers that operate a wire spooling device, wherein the wire spooling device is biased in a wire unwinding direction. In this shift control device, the wire spooling device comprises a wire winding plate that rotates integrally with the first lever. An indexing plate also rotates integrally with the first lever, wherein the indexing plate has an indexing slot defining a plurality of indexing teeth staggered on opposite sides of the indexing slot. The second lever has an indexing pin that engages successive ones of the indexing teeth within the indexing slot such that the wire winding plate, indexing plate and first lever together may be held in multiple rotational positions corresponding to the indexing teeth. Operation of the second lever from a rest position to an operating position and back to the rest position allows the indexing pin to move sequentially from one indexing tooth to another. This, in turn, correspondingly moves the wire winding plate, indexing plate and first lever to a plurality of positions in the wire unwinding direction.

SUMMARY OF THE INVENTION

The present invention is directed to various features of a shift control device for a bicycle transmission. In one embodiment, a shift control device for a bicycle transmission comprises a mounting member adapted to mount the shift control device to a bicycle; a first lever operatively coupled to the mounting member such that the first lever stops at a plurality of positions corresponding to gear positions of the bicycle transmission, wherein the first lever moves in a first plane; and a second lever operatively coupled to the mounting member for movement in a second plane between a rest position and an operating position such that the second lever returns to the rest position after moving to the operating position. In this embodiment, the first plane is substantially parallel to the second plane.

In another embodiment, a shift control device for a bicycle transmission comprises a mounting member adapted to mount the shift control device to a bicycle, a first lever operatively coupled to the mounting member such that the first lever stops at a plurality of positions corresponding to gear positions of the bicycle transmission, and a second lever operatively coupled to the mounting member for movement between a rest position and an operating position such that the second lever returns to the rest position after moving to the operating position. A positioning unit rotates to a plurality of positions corresponding to gear positions of the bicycle transmission, and a motion limiting member is disposed on the second lever to limit motion of the positioning unit during operation of the second lever.

In another embodiment, a shift control for a bicycle transmission comprises a mounting member adapted to mount the shift control device to a bicycle handlebar, a first lever operatively coupled to the mounting member such that the first lever stops at a plurality of positions corresponding to gear positions of the bicycle transmission, a second lever operatively coupled to the mounting member for movement between a rest position and an operating position such that the second lever returns to the rest position after moving to the operating position, and a positioning unit that rotates to a plurality of positions corresponding to gear positions of the bicycle transmission. The first lever and the second lever are coupled to the mounting member such that the first lever and the second lever are located above the bicycle handlebar when the shift control device is mounted to the handlebar.

In another embodiment, a bicycle control apparatus comprises a mounting member adapted to mount the bicycle control apparatus to a bicycle, a positioning unit coupled to the mounting member for moving to a plurality of positions, and a positioning member that maintains the positioning unit in each of the plurality of positions. The positioning member comprises a material that deforms in response to excessive force applied between the positioning member and the positioning unit to release the positioning unit from a maintained position.

In another embodiment, a shift control device for a bicycle transmission comprises a mounting member adapted to mount the shift control device to a bicycle, a positioning unit coupled to the mounting member for moving to a plurality of positions, a first lever that moves in a first lever direction to move the positioning unit in a first gear position direction, and a second lever that moves in a second lever direction to move the positioning unit in a second gear position direction opposite the first gear position direction, wherein the first lever direction is the same as the second lever direction. A motion allowing member is coupled to the mounting unit to allow movement of the positioning unit in the second gear position direction, and a motion limiting member is disposed on the second lever for moving in the second direction to limit motion of the positioning unit in the second gear position direction during operation of the second lever.

In another embodiment, a shift control device for a bicycle transmission comprises a mounting member adapted to mount the shift control device to a bicycle handlebar, a lever operatively coupled to the mounting member such that the lever stops at a plurality of positions corresponding to gear positions of the bicycle transmission, a push button operatively coupled to the mounting member for movement between a rest position and an operating position such that the push button returns to the rest position after moving to the operating position, and a positioning unit that rotates to a plurality of positions corresponding to gear positions of the bicycle transmission. The lever and the push button are operatively coupled to the positioning unit such that the positioning unit moves in a first direction in response to operation of the first lever and moves in a second direction opposite the first direction in response to operation of the push button.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
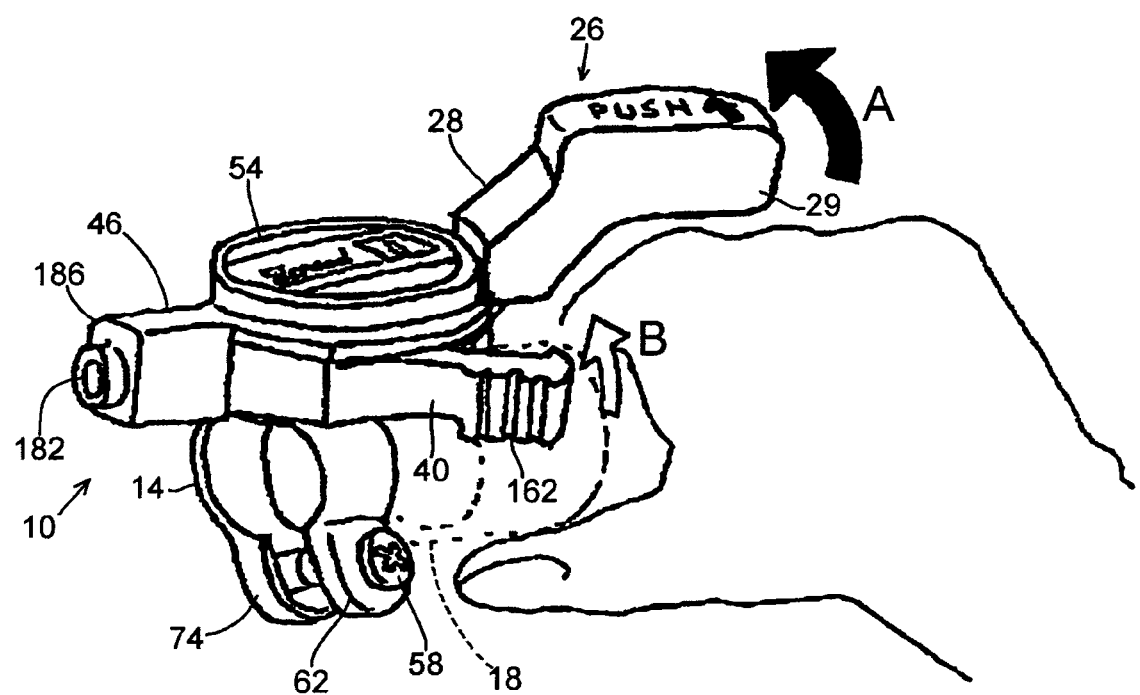
FIG. 1 is an elevational view of a particular embodiment of a shift control device for a bicycle transmission.
Figure 2:
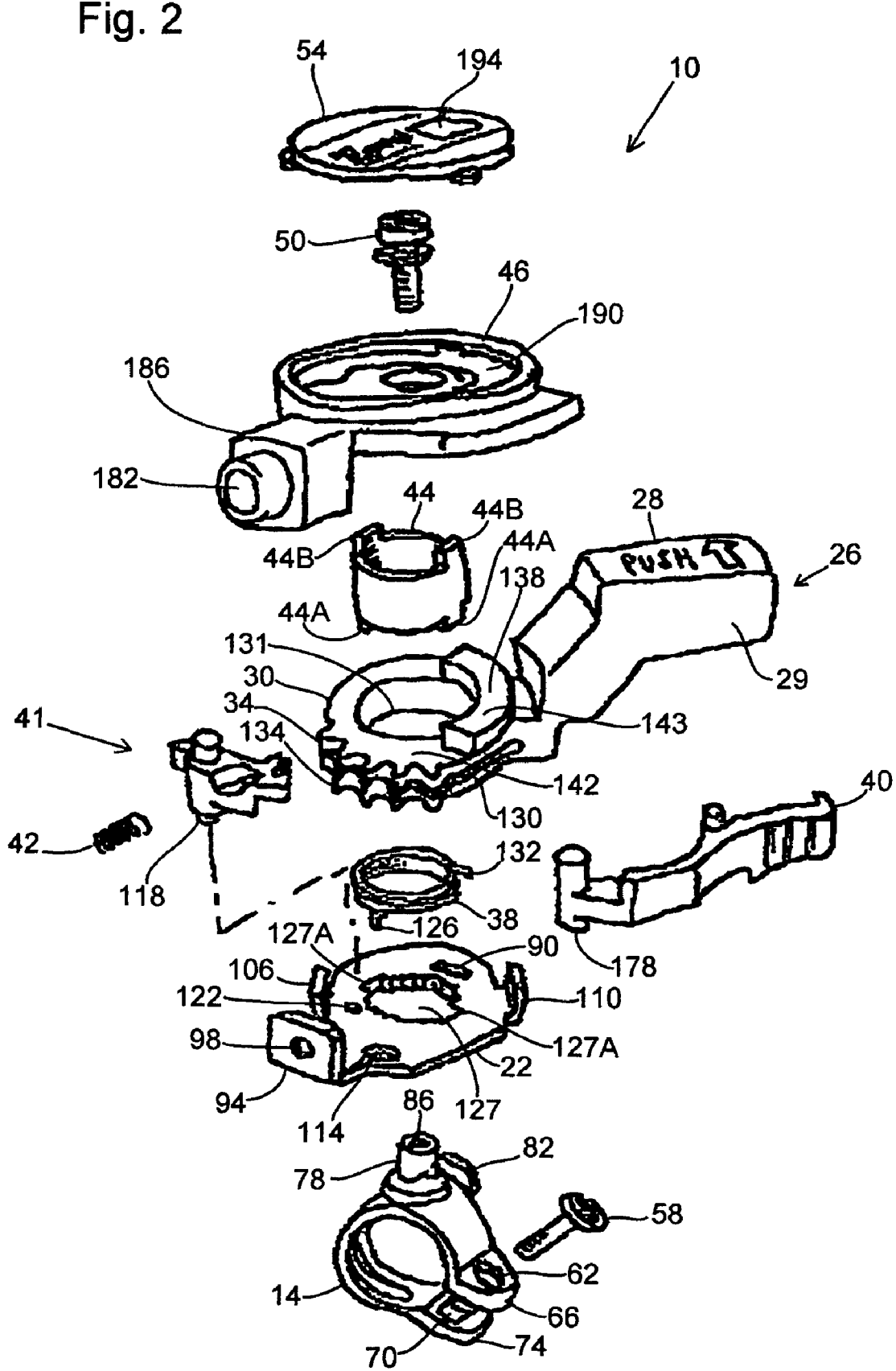
FIG. 2 is an exploded view of the shift control device.

FIG. 1 is an elevational view of a particular embodiment of a shift control device 10 that may be used with a bicycle transmission, for example, and FIG. 2 is an exploded view of shift control device 10. Shift control device 10 comprises an attachment band 14 that fastens shift control device 10 to a handlebar 18; a mounting member such as a base plate 22; a winding lever assembly 26 comprising an integrally formed first lever such as a winding lever 28, a takeup element 30 and a positioning unit such as a positioning ratchet 34; a return spring 38 for biasing winding lever assembly 26 in a wire releasing (unwinding) direction; a second lever such as a release lever 40, a positioning pawl 41 (which also functions as a motion allowing member), a pawl bias spring 42, a bushing 44 for rotatably supporting winding lever assembly 26, a cover plate 46, an assembly screw 50 for fixing attachment band 14, base plate 22, winding lever assembly 26, bushing 44 and cover plate 46 together, and a top plate 54 that attaches to cover plate 46.

Attachment band 14 fastens shift control device 10 to handlebar 18 in a conventional manner using a screw 58 that passes though an opening 62 in one attachment ear 66 and screws into a threaded opening 70 in another attachment ear 74. Attachment band 14 also includes a support post 78 and a base plate fixing flange 82. Support post 78 includes a threaded opening 86 for receiving assembly screw 50, and base plate fixing flange 82 engages a slot 90 in base plate 22 for nonrotatably fixing base plate 22 to attachment band 14.

Base plate 22 includes an upstanding cable guide flange 94 with a cable guide opening 98 for receiving an inner cable 102 (FIG. 3) of a Bowden cable assembly (not shown) therethrough. An upstanding cable winding stop 106 is provided for limiting counterclockwise rotation of winding lever assembly 26, and an upstanding combination stop 110 is provided for limiting clockwise rotation of winding lever assembly 26 and counterclockwise rotation of release lever 40. An elongated opening 114 is provided for receiving a lower end of a mounting axle 118 of positioning pawl 41 therein, and a spring mounting opening 122 is provided for mounting an end 126 of return spring 38 therein. A central opening 127 is provided for receiving support post 78 therethrough. Support opening 127 includes a pair of opposed recesses 127A for engaging corresponding mounting ears 44A of bushing 44 to nonrotatably mount bushing 44 to base plate 22.

As noted above, winding lever assembly 26 comprises an integrally formed winding lever 28, takeup element 30 and positioning ratchet 34. Winding lever 28 steps upwardly from takeup element 30 such that, when shift control device 10 is mounted to handlebar 18, a finger contact portion 29 of winding lever 28 is disposed above handlebar 18. Opposite sides 28A and 28B (FIG. 3) of winding lever 28 abut against cable winding stop 106 and combination stop 110, respectively, to limit the range of motion of winding lever assembly 26. In this embodiment, finger contact portion 29 of winding lever 28 moves within a plane P1 (FIG. 3).

Takeup element 30 is an annular member with a cable winding groove 130 for winding and unwinding inner cable 102. Takeup element 30 defines a central opening 131 for receiving bushing 44 therein so that takeup element 30 is radially and rotatably supported by bushing 44. An upstanding indicator member 138 extends circumferentially along an upper surface 142 of takeup element 30 in close proximity to central opening 131. A plurality of gear indicating indicia (e.g., numerals) are disposed on an upper surface 143 of indicator member 138. An end 132 of return spring 38 is mounted to a spring mounting opening (not shown) on the underside of takeup element 30 so that return spring 38 biases takeup element 30, and thereby winding lever assembly 26, in a clockwise direction.

Positioning ratchet 34 comprises a plurality of circumferentially spaced positioning teeth 134 that project radially outwardly from takeup element 30. The spacing of positioning teeth 134 is such that the distance between adjacent positioning teeth 134 corresponds to the amount of pulling of inner cable 102 required to move the bicycle transmission to successive gear positions. For example, if the bicycle transmission comprises a derailleur, then the spacing of positioning teeth 134 is such that the distance between adjacent positioning teeth 134 corresponds to the amount of pulling of inner cable 102 required to move the derailleur from one sprocket to another.

Figure 3:
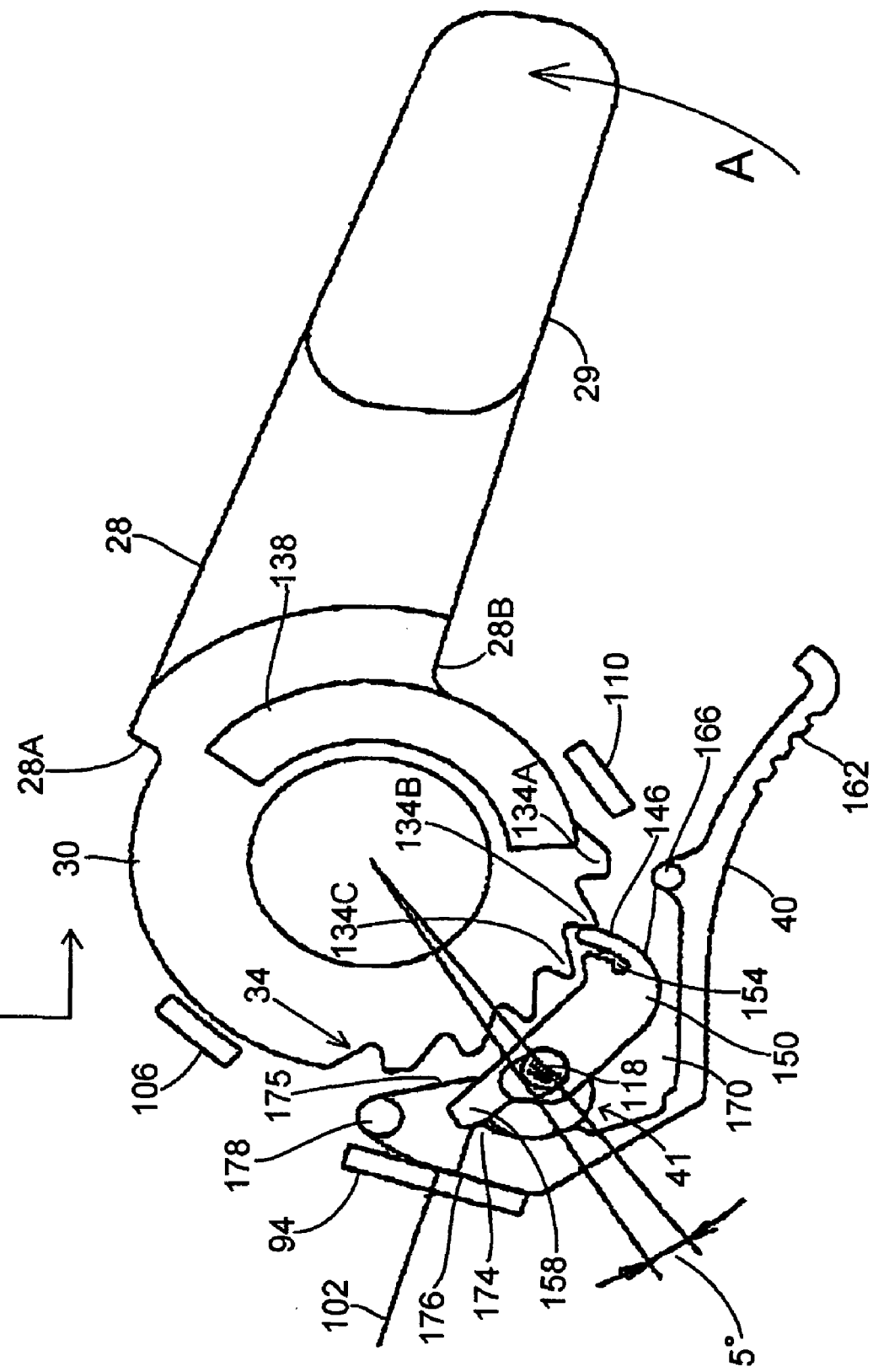
FIG. 3 is a top view of relevant components of the shift control device illustrating a wire winding operation.

As shown more clearly in FIG. 3, positioning pawl 41 comprises a pawl tooth 146 disposed on one end of a pawl body 150 and a control tail 158 disposed on an opposite end of pawl body 150. Pawl tooth 146 engages selective ones of the plurality of positioning teeth 134 to maintain takeup element 30, and hence winding lever 28, in a plurality of positions corresponding to gear positions of the bicycle transmission. A slit 154 is formed between pawl tooth 146 and a radially inner portion of pawl body 150 (relative to mounting axle 118) so that pawl tooth 146 is capable of flexing relative to pawl body 150. This allows pawl tooth 146 to disengage from a currently engaged positioning tooth 134 in the event takeup element 30 is subjected to excessive force in the cable unwinding direction, thereby avoiding damage to the components.

As noted above, the lower end of mounting axle 118 of positioning pawl 41 is mounted within elongated opening 114 in base plate 22. An upper end of mounting axle 118 is mounted in a similar elongated opening (not shown) in cover plate 46. The elongated openings are dimensioned to provide play of approximately 5 degrees of rotation of winding lever assembly 26 before pawl tooth 146 begins to disengage from an engaged ratchet tooth 134. Such play is commonly used to provide a well known overshift function when operating a derailleur transmission. This function will be described in more detail below.

Release lever 40 comprises a finger contact portion 162, a stopper 166 for contacting combination stopper 110 on base plate 22 to limit counterclockwise rotation of release lever 40, a recessed portion 170 for receiving positioning pawl 41 therein during operation, a motion control member 174 extending radially inwardly (relative to support post 78) for contacting control tail 158 of positioning pawl 41 during operation of release lever 40, a motion limiting member 175 extending radially inwardly (relative to support post 78) for contacting selective ones of the plurality of positioning teeth 134 during operation of release lever 40, a clockwise stopper portion 176 for contacting cable guide flange 94 on base plate 22 to limit clockwise rotation of release lever 40, and a release lever axle 178. The lower portion of release lever axle 178 is rotatably mounted to an opening (not shown) in base plate 22, and an upper portion of release lever axle 178 is rotatably mounted to an opening (not shown) in cover plate 46. In this embodiment, finger contact portion 162 of release lever 40 moves in a plane P2 (FIG. 4) that is substantially parallel to plane P1 (FIG. 3).

As noted above, cover plate 46 is attached to base plate 22 by assembly screw 50. When so attached, an opening 182 of an outer casing stopper 186 aligns with cable guide opening 98 in cable guide flange 94, mounting ears 44B of bushing 44 engage corresponding slots (not shown) in cover plate 46, and indicator member 138 on takeup element 30 is disposed in an indicator slot 190 in cover plate 46. Outer casing stopper 186 is used to terminate the outer casing (not shown) of the Bowden cable assembly. When top plate 54 is attached to the top of cover plate 46, a window 194 in top plate 54 is disposed over indicator member 138 such that the gear indicating indicia can be viewed through window 194. For example, if the gear indicating indicia take the form of numerals, than the numeral corresponding to the current transmission gear position will be displayed in window 194.

Operation of shift control device 10 in a wire winding direction is illustrated in FIG. 3. When winding lever 28 is rotated in the counterclockwise direction A, takeup element 30 begins winding inner cable 102, and mounting axle 118 moves from the left end of opening 114 (shown in FIG. 4) to the right end of opening 114 as shown in FIG. 3 before pawl tooth 146 begins to move relative to a positioning tooth 134B. Further rotation of winding lever 28 causes a positioning tooth 134C to press against pawl tooth 146, thus rotating positioning pawl 41 clockwise until pawl tooth 146 passes over positioning tooth 134C and engages the clockwise side of positioning tooth 134C.

As noted above, if the bicycle transmission comprises a derailleur, then the spacing between adjacent positioning teeth 134 is such that inner cable 102 will be pulled enough to move the derailleur the distance between adjacent sprockets. However, inner cable 102 already was pulled by a certain amount before pawl tooth 146 began to move away from positioning tooth 134B. Thus, by the time pawl tooth 146 passes over positioning tooth 134C, inner cable 102 has been pulled by an amount greater than required to move the derailleur from the originating sprocket to the destination sprocket. As a result, the derailleur moves the chain slightly beyond the destination sprocket. As is well known in the art, this helps to ensure that the chain reliably engages the destination sprocket. When the rider removes the rotational force from winding lever 28, axle 118 of positioning pawl 41 moves back to the left end of opening 114, thus allowing takeup element 30 to slightly unwind inner cable 102 so that the derailleur moves back to align the chain with the destination sprocket.

Figure 4:
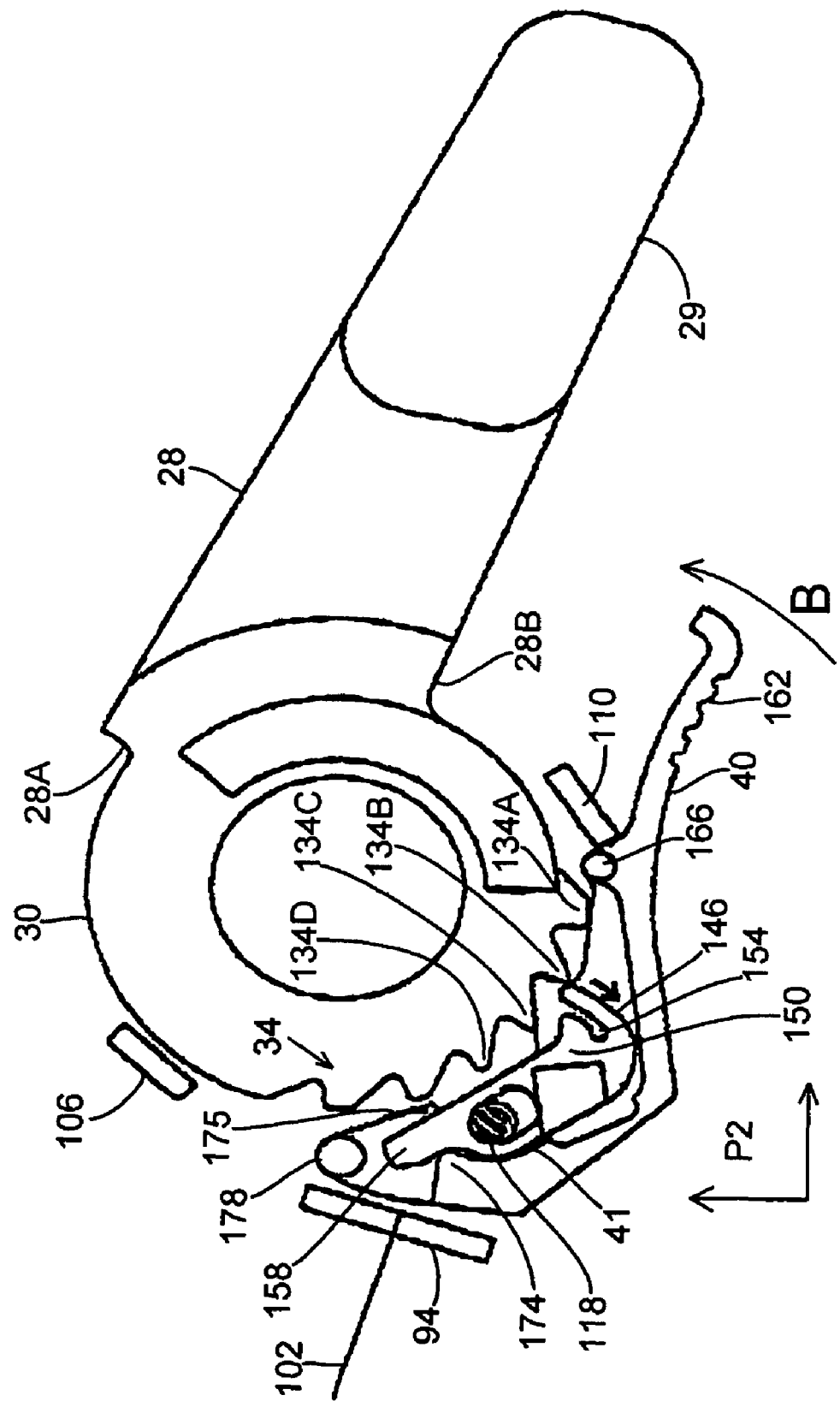
FIG. 4 is a top view of relevant components of the shift control device illustrating a wire unwinding operation.

Operation of shift control device 10 in the wire unwinding direction is illustrated in FIG. 4. When release lever 40 is rotated in the counterclockwise direction B from the rest position shown in FIG. 3 to an operating position shown in FIG. 4, motion control member 174 presses against control tail 158 of positioning pawl 41, thus rotating positioning pawl 41 clockwise. When pawl tooth 146 of positioning pawl 41 clears the tip of positioning tooth 134B, winding lever 28 rotates clockwise as a result of the clockwise biasing force of return spring 38 (alone or in combination with any biasing force of the bicycle transmission). Thereafter, motion limiting member 175 abuts against a positioning tooth 134D to avoid uncontrolled rotation of winding lever 28. When the rider removes the counterclockwise rotational force from release lever 40, motion control member 174 releases the pressure against control tail 158 of positioning pawl 41, thus allowing positioning pawl 41 to rotate counterclockwise in accordance with the counterclockwise biasing force of pawl bias spring 42. Motion limiting member 175 on release lever 40 and pawl tooth 146 of positioning pawl 41 are structured such that pawl tooth 146 enters the space between positioning teeth 134A and 134B before motion limiting member 175 disengages from positioning tooth 134D. As a result, pawl tooth 146 abuts against positioning tooth 134A to prevent further rotation of takeup element 30 shortly after motion limiting member 175 disengages from positioning tooth 134D, and takeup element 30 positions inner cable 102 to place the bicycle transmission in the desired gear.

Figure 5:
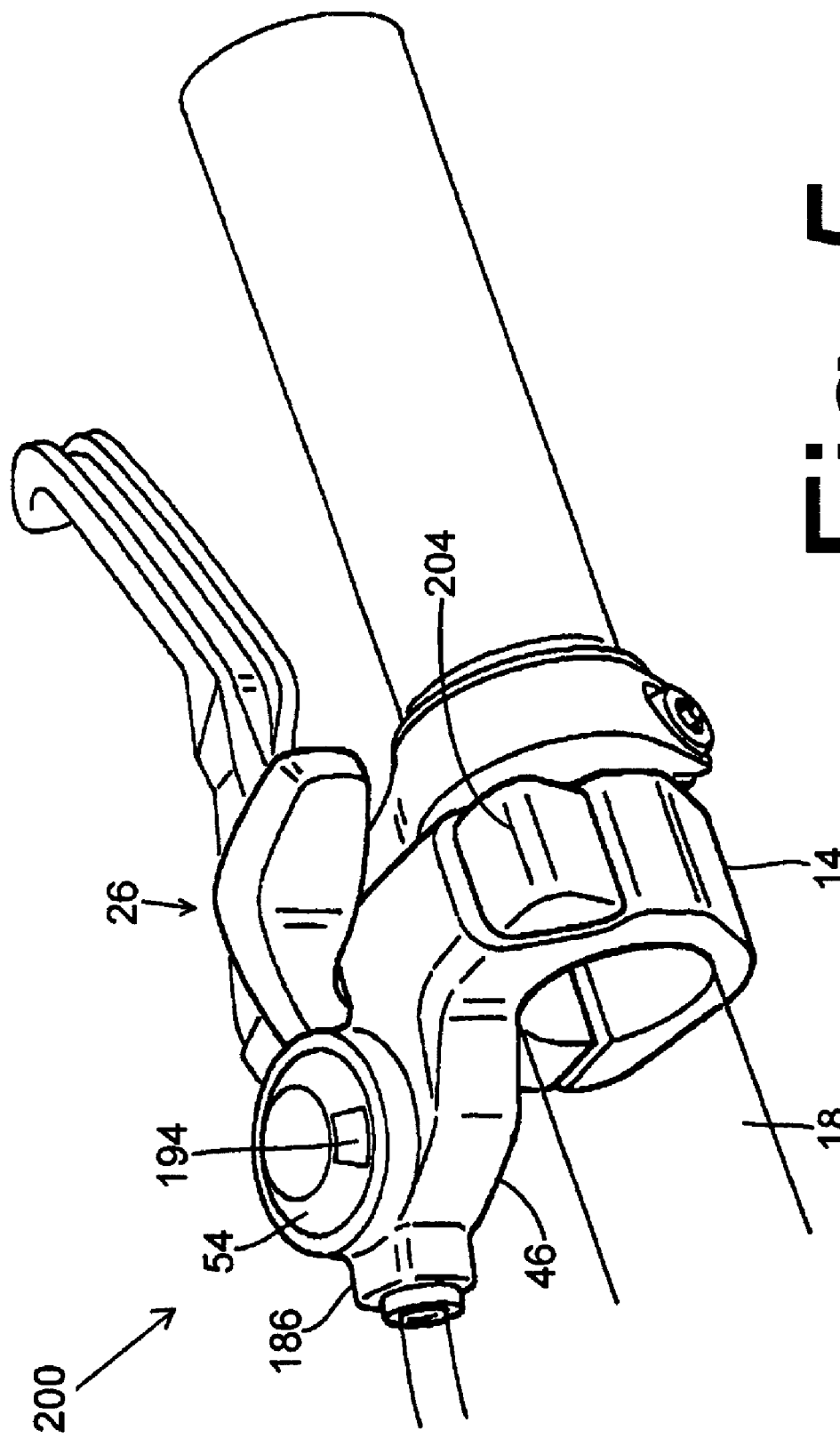
FIG. 5 is an elevational view of another embodiment of a shift control device for a bicycle transmission.

FIG. 5 is an elevational view of another embodiment of a shift control device 200 for a bicycle transmission. This embodiment shares many features of the first embodiment, so the same components share the same reference numbers. Shift control device 200 has a winding lever assembly 26 that operates in the same manner as winding lever assembly 26 in the first embodiment, so a further description thereof will be omitted. Shift control device 200 differs from shift control device 10 in the first embodiment in that a push button 204 is provided for performing the wire unwinding operation. Push button 204 is operatively coupled to base plate 22 or some other structure for movement along an axis Z (FIG. 6) between a rest position and an operating position such that push button 204 returns to the rest position after moving to the operating position. Push button 204 may be structured to move in a substantially straight line or be hinged to swing in an arc. In this embodiment, push button 204 is surrounded by cover plate 46 such that push button 204 is pushed into cover plate 46 when moving from the rest position to the operating position. In this case, axis Z is substantially perpendicular to handlebar (18) as well as the rotational axis of winding lever assembly 26.

Figure 6:
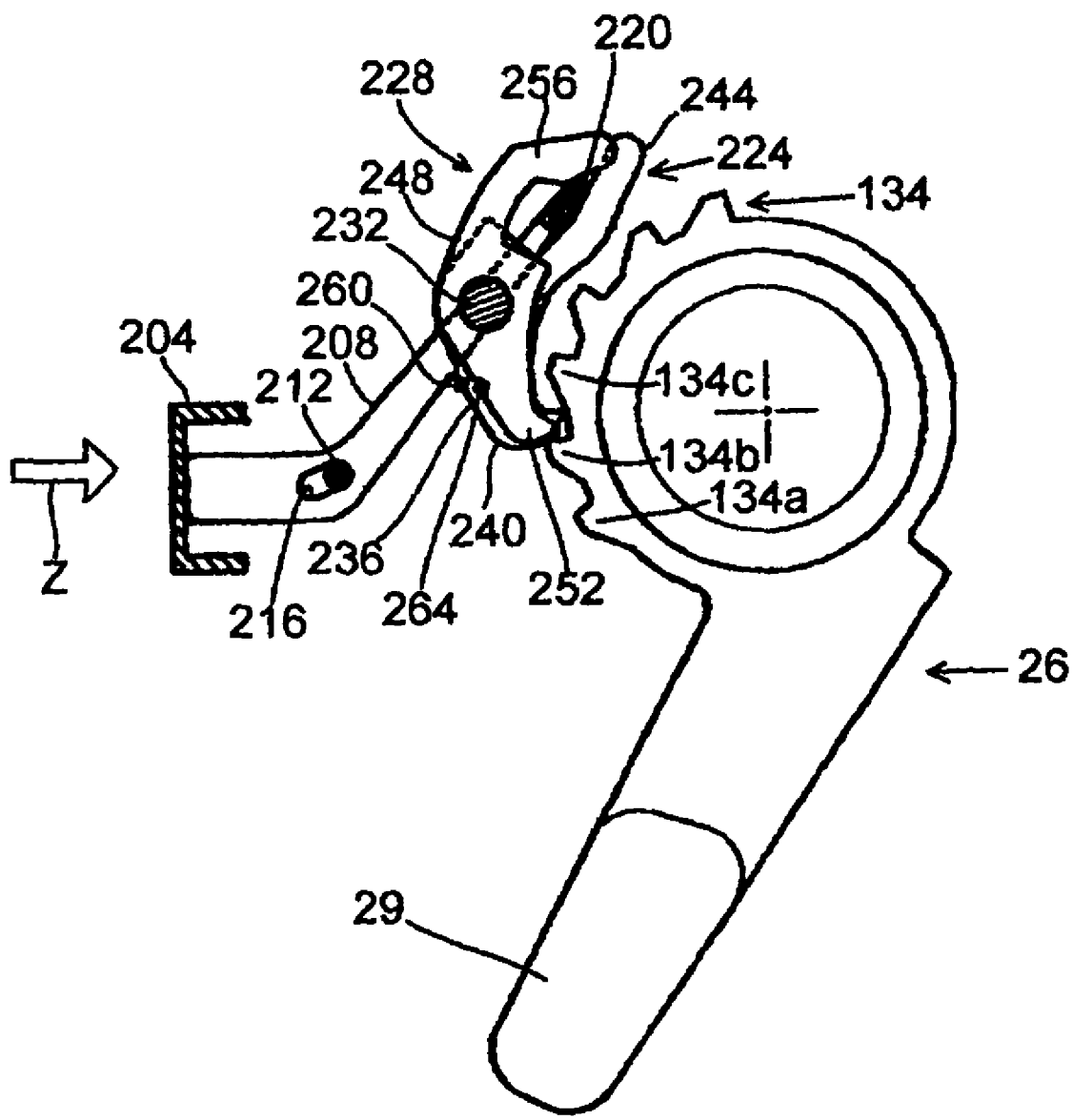
FIG. 6 is a top view of relevant components of the shift control device shown in FIG. 5 that differ from the first embodiment.

As shown in FIG. 6, push button 204 presses against a pawl control rod 208 that is guided by a guide pin 212, wherein guide pin 212 is mounted to base plate 22 and extends into a slot 216 in pawl control rod 208. Pawl control rod 208 includes a pawl control tab 220 that extends vertically upwardly from a free end thereof for controlling the operation of a positioning member in the form of a positioning pawl 224 as well as a motion limiting member in the form of a motion limiting pawl 228.

In this embodiment, positioning pawl 224 and motion limiting pawl 228 rotate around a common axis defined by a pivot shaft 232 mounted to base member 22. Positioning pawl 224 comprises a pawl body 236 rotatably supported by pivot shaft 232, a pawl tooth 240 disposed on one end of pawl body 236, and a control tail 244 disposed on an opposite end of pawl body 236. Similarly, motion limiting pawl 228 comprises a pawl body 248 rotatably supported by pivot shaft 232, a pawl tooth 252 disposed on one end of pawl body 248 and a control tail 256 disposed on an opposite end of pawl body 236. One end 260 of a pawl spring engages pawl body 236, and another end 264 of the pawl spring engages pawl body 248. As a result, positioning pawl 224 and motion limiting pawl 228 are biased in a counterclockwise direction.

Assume winding lever assembly 26 is in the position shown in FIG. 6 with pawl tooth 240 abutting against positioning tooth 134B. When push button 204 is pressed to perform a wire unwinding operation, pawl control tab 220 enters the space between control tail 244 of positioning pawl 224 and control tail 256 of motion limiting pawl 228. Initially, pawl control tab 220 presses against control tail 256 of motion limiting pawl 228 and rotates motion limiting pawl 228 counterclockwise until pawl tooth 252 is locked in place between positioning teeth 134B and 134C. Thereafter, pawl control tab 220 presses against control tail 244 of positioning pawl 224 to thereby rotate positioning pawl 224 clockwise until pawl tooth 240 disengages from positioning tooth 134B. Thus, positioning pawl 224 also functions as a motion allowing member that allows winding lever assembly 26 to rotate slightly clockwise until pawl tooth 252 of motion limiting pawl 228 abuts against positioning tooth 134B.

When push button 204 is released, pawl control tab 220 initially moves away from control tail 244 of positioning pawl 224, thus allowing pawl tooth 240 of positioning pawl 224 to rest on top of positioning tooth 134B. Thereafter, pawl control tab 220 moves away from control tail 256 of motion limiting pawl 228 so that motion limiting pawl 228 is no longer locked in position. Since the outer peripheral surface of pawl tooth 252 of motion limiting pawl 228 has a curved shape, positioning tooth 134B slides along pawl tooth 252 and rotates motion limiting pawl 228 clockwise as winding lever assembly 26 rotates clockwise. Pawl tooth 240 of positioning pawl 224 then enters the space between positioning teeth 134A and 134B and eventually abuts against positioning tooth 134A to maintain winding lever assembly 26 in the new position.

The structures of the foregoing embodiments provide very easy operation while still being simple and economical to manufacture compared to conventional. This is especially true since the unitary winding lever assembly 26 in both embodiments provides the three functions of a shift lever, takeup element and gear indicator.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A shift control device for a bicycle transmission comprising:
   a mounting member adapted to mount the shift control device to a bicycle;
   a first lever operatively coupled to the mounting member, wherein the first lever moves in a first plane;
   a second lever operatively coupled to the mounting member for movement in a second plane between a rest position and an operating position such that the second lever returns to the rest position after moving to the operating position;
   wherein the first plane is substantially parallel to the second plane;
   a positioning unit that rotates to and is maintained in a plurality of positions corresponding to gear positions of the bicycle; and
   a positioning member that moves relative to the second lever and that is controlled by the second lever to operate the positioning unit;
   wherein the first lever is operatively coupled to the positioning unit so that the first lever is maintained in a plurality of positions corresponding to gear positions of the bicycle transmission in addition to beginning and end positions of a range of motion of the first lever, wherein the beginning position is different from the end position.

2. The device according to claim 1 wherein the first lever rotates within the first plane.

3. The device according to claim 1 wherein the second lever rotates within the second plane.

4. The device according to claim 1 wherein the positioning unit moves to the plurality of positions corresponding to gear positions of the bicycle in response to movement of the first lever and the second lever.

5. The device according to claim 4 wherein the positioning unit moves in a first positioning unit direction in response to movement of the first lever, and wherein the positioning unit moves in a second positioning unit direction opposite the first positioning unit direction in response to movement of the second lever.

6. The device according to claim 5 wherein the first lever moves in a first lever direction to move the positioning unit in the first positioning unit direction, wherein the second lever moves in a second lever direction to move the positioning unit in the second positioning unit direction, wherein the first lever direction is the same as the second lever direction.

7. The device according to claim 5 wherein the first lever rotates in a first lever direction to move the positioning unit in the first positioning unit direction, and wherein the second lever rotates in a second lever direction to move the positioning unit in the second positioning unit direction.

8. The device according to claim 7 wherein the first lever direction is the same as the second lever direction.

9. The device according to claim 5 wherein the positioning member maintains the positioning unit in each of the plurality of positions corresponding to gear positions of the bicycle.

10. The device according to claim 9 wherein the positioning member allows the positioning unit to move in the second positioning unit direction in response to movement of the second lever.

11. The device according to claim 10 further comprising a motion limiting member that limits movement of the positioning unit in response to movement of the second lever.

12. The device according to claim 11 wherein the motion limiting member is retained to the second lever.

13. The device according to claim 12 wherein the motion limiting member is one piece with the second lever.

14. The device according to claim 1 wherein the first lever and the second lever are coupled to the mounting member such that the first lever and the second lever are located above the bicycle handlebar when the shift control device is mounted to the bicycle handlebar.

15. A shift control device for a bicycle transmission comprising:
- a mounting member adapted to mount the shift control device to a bicycle;
- a first lever operatively coupled to the mounting member;
- a second lever operatively coupled to the mounting member for movement between a rest position and an operating position such that the second lever returns to the rest position after moving to the operating position;
- a positioning unit that rotates to and is maintained in a plurality of positions corresponding to gear positions of the bicycle; and
- a motion limiting member operatively coupled to the second lever to limit motion of the positioning unit during operation of the second lever;
- wherein the first lever is operatively coupled to the positioning unit so that the first lever is maintained in a plurality of positions corresponding to gear positions of the bicycle transmission in addition to beginning and end positions of a range of motion of the first lever, wherein the beginning position is different from the end position.

16. The device according to claim 15 wherein the motion limiting member moves together with the second lever.

17. The device according to claim 16 wherein the motion limiting member is one piece with the second lever.

18. The device according to claim 15 wherein the positioning unit rotates in a first positioning unit direction in response to movement of the first lever, and wherein the positioning unit rotates in a second positioning unit direction opposite the first positioning unit direction in response to movement of the second lever.

19. The device according to claim 18 wherein the first lever moves in a first lever direction to rotate the positioning unit in the first positioning unit direction, wherein the second lever moves in a second lever direction to rotate the positioning unit in the second positioning unit direction, and wherein the first lever direction is the same as the second lever direction.

20. The device according to claim 15 wherein the first lever rotates in a first lever direction to move the positioning unit in the first positioning unit direction, and wherein the second lever rotates in a second lever direction to move the positioning unit in the second positioning unit direction.

21. The device according to claim 20 wherein the first lever direction is the same as the second lever direction.

22. The device according to claim 15 further comprising a positioning member that maintains the positioning unit in each of the plurality of positions.

23. The device according to claim 22 wherein the positioning member allows the positioning unit to move in the second positioning unit direction in response to movement of the second lever.

24. The device according to claim 23 wherein the motion limiting member moves together with the second lever.

25. The device according to claim 24 wherein the motion limiting member is one piece with the second lever.

26. The device according to claim 15 wherein the first lever and the second lever are coupled to the mounting member such that the first lever and the second lever are located above the bicycle handlebar when the shift control device is mounted to the handlebar.

27. The device according to claim 15 wherein the first lever moves in a first plane, wherein the second lever moves in a second plane, and wherein the first plane is substantially parallel to the second plane.

28. A shift control device for a bicycle transmission comprising:
- a mounting member adapted to mount the shift control device to a bicycle handlebar;
- a first lever operatively coupled to the mounting member;
- a second lever operatively coupled to the mounting member for movement between a rest position and an operating position such that the second lever returns to the rest position after moving to the operating position;
- a positioning unit that rotates to and is maintained in a plurality of positions corresponding to gear positions of the bicycle transmission in response to movement of one of the first lever and the second lever;
- wherein the first lever and the second lever are coupled to the mounting member such that the first lever and the second lever are located above the bicycle handlebar when the shift control device is mounted to the handlebar; and
- wherein the first lever is operatively coupled to the positioning unit so that the first lever is maintained in a plurality of positions corresponding to gear positions of the bicycle transmission in addition to beginning and end positions of a range of motion of the first lever, wherein the beginning position is different from the end position.

29. The device according to claim 28 wherein the first lever moves in a first plane, wherein the second lever moves in a second plane, and wherein the first plane is substantially parallel to the second plane.

30. The device according to claim 28 wherein the positioning unit rotates to a plurality of positions corresponding to gear positions of the bicycle transmission in response to movement of the first lever and the second lever.

31. The device according to claim 30 wherein the positioning unit rotates to the plurality of positions corresponding to gear positions of the bicycle transmission in response to rotation of the first lever and the second lever.

32. The device according to claim 30 wherein the positioning unit moves in a first positioning unit direction in response to movement of the first lever, and wherein the positioning unit moves in a second positioning unit direction opposite the first positioning unit direction in response to movement of the second lever.

33. The device according to claim 32 wherein the first lever moves in a first lever direction to move the positioning unit in the first positioning unit direction, wherein the second lever moves in a second lever direction to move the positioning unit in the second positioning unit direction, and wherein the first lever direction is the same as the second lever direction.

34. The device according to claim 32 wherein the first lever rotates in a first lever direction to move the positioning unit in the first positioning unit direction, and wherein the second lever rotates in a second lever direction to move the positioning unit in the second positioning unit direction.

35. The device according to claim 34 wherein the first lever direction is the same as the second lever direction.

36. The device according to claim 32 further comprising a positioning member that maintains the positioning unit in each of the plurality of positions corresponding to gear positions of the bicycle transmission.

37. The device according to claim 36 wherein the positioning member allows the positioning unit to move in the second positioning unit direction in response to movement of the second lever.

38. The device according to claim 37 further comprising a motion limiting member that limits movement of the positioning unit in response to movement of the second lever.

39. The device according to claim 38 wherein the motion limiting member is retained to the second lever.

40. The device according to claim 39 wherein the motion limiting member is one piece with the second lever.

41. A bicycle control apparatus comprising:
a mounting member adapted to mount the bicycle control apparatus to a bicycle;
a positioning unit coupled to the mounting member for moving to a plurality of positions; and
a positioning member that maintains the positioning unit in each of the plurality of positions,
wherein the positioning member comprises a material that deforms in response to excessive force applied between the positioning member and the positioning unit to release the positioning unit from a maintained position;
a first lever operatively coupled to the positioning unit so that the positioning unit moves in response to movement of the first lever;
a second lever operatively coupled to the positioning unit so that the positioning unit moves in response to movement of the second lever;
wherein the positioning unit moves in a first positioning unit direction in response to movement of the first lever;
wherein the positioning unit moves in a second positioning unit direction opposite the first positioning unit direction in response to movement of the second lever;
wherein the first lever moves in a first lever direction to move the positioning unit in the first positioning unit direction;
wherein the second lever moves in a second lever direction to move the positioning unit in the second positioning unit direction; and
wherein the first lever direction is the same as the second lever direction.

42. The apparatus according to claim 41 wherein the first lever stops at a plurality of positions corresponding to gear positions of the bicycle transmission.

43. The apparatus according to claim 41 wherein the first lever rotates in the first lever direction to move the positioning unit in the first positioning unit direction, and wherein the second lever rotates in the second lever direction to move the positioning unit in the second positioning unit direction.

44. The apparatus according to claim 41 wherein the positioning member allows the positioning unit to move in the second positioning unit direction in response to movement of the second lever.

45. The apparatus according to claim 44 further comprising a motion limiting member that limits movement of the positioning unit in response to movement of the second lever.

46. The apparatus according to claim 45 wherein the motion limiting member is retained to the second lever.

47. The apparatus according to claim 46 wherein the motion limiting member is one piece with the second lever.

48. The apparatus according to claim 41 wherein the first lever and the second lever are coupled to the mounting member such that the first lever and the second lever are located above the bicycle handlebar when the shift control device is mounted to the handlebar.

49. The apparatus according to claim 41 wherein the first lever moves in a first plane, wherein the second lever moves in a second plane, and wherein the first plane is substantially parallel to the second plane.

50. The apparatus according to claim 41 wherein the positioning member flexes in response to excessive force applied between the positioning member and the positioning unit to release the positioning unit from the maintained position.

51. The apparatus according to claim 50 wherein the positioning member comprises a pawl having a pawl tooth disposed on a pawl body.

52. The apparatus according to claim 51 wherein a slit is disposed between the pawl tooth and the pawl body so that the pawl tooth flexes relative to the pawl body to release the positioning unit from the maintained position.

53. A shift control device for a bicycle transmission comprising:
a mounting member adapted to mount the shift control device to a bicycle;
a positioning unit coupled to the mounting member for moving to a plurality of positions;
a first lever that moves in a first lever direction to move the positioning unit in a first gear position direction;
a second lever that moves in a second lever direction to initiate movement of the positioning unit in a second gear position direction opposite the first gear position direction;
wherein the first lever direction is the same as the second lever direction;
a motion allowing member coupled to the mounting unit to allow movement of the positioning unit in the second gear position direction; and
a motion limiting member retained to the second lever and moving in the second lever direction to limit motion of the positioning unit in the second gear position direction during operation of the second lever;
wherein the motion allowing member moves relative to the second lever and is controlled by the second lever to initiate movement of the positioning unit.

54. The device according to claim 53 wherein the first lever direction is one of a clockwise and a counterclockwise direction.

55. The device according to claim 53 wherein the first lever and the second lever are coupled to the mounting member such that the first lever and the second lever are located above the bicycle handlebar when the shift control device is mounted to the handlebar.

56. The device according to claim 53 wherein the first lever moves in a first plane, wherein the second lever moves in a second plane, and wherein the first plane is substantially parallel to the second plane.

57. The device according to claim 53 wherein the motion limiting member is formed as one piece with the second lever.

58. A bicycle control apparatus comprising:
a mounting member adapted to be mounted to a bicycle;
a positioning unit coupled to the mounting member for moving to a plurality of positions;
a positioning member that maintains the positioning unit in each of the plurality of positions;
wherein the positioning member moves along a first path between an engagement position,
where the positioning member engages the positioning unit, and a disengagement position where the positioning member is disengaged from the positioning unit;
wherein the positioning unit causes the positioning member to move along a second path that is different from the first path; and wherein movement of the positioning member along the second path includes movement of the positioning member other than rotation of the positioning member.

59. The apparatus according to claim 58 wherein the positioning member moves along the second path when the positioning unit moves to at least one of the plurality of positions.

60. The apparatus according to claim 58 wherein the positioning member includes one of a projection and an opening that engages a corresponding other one of a projection and an opening disposed with the mounting member.

61. The apparatus according to claim 60 wherein the positioning member rotates around the projection to move between the engagement position and the disengagement position.

62. The apparatus according to claim 61 wherein the positioning member includes the projection, and wherein the opening is disposed with the mounting member.

63. The apparatus according to claim 58 wherein the positioning unit rotates to each of the plurality of positions.

64. The apparatus according to claim 63 wherein the positioning unit includes a plurality of positioning teeth, and wherein the positioning member engages at least one of the plurality of positioning teeth to maintain the positioning unit in each of the plurality of positions.

65. The apparatus according to claim 64 wherein the positioning member comprises a positioning pawl.

66. The apparatus according to claim 65 wherein the positioning unit comprises a takeup element for pulling and releasing a control element.

67. The apparatus according to claim 66 wherein the takeup element includes a winding surface.

68. The apparatus according to claim 67 wherein the winding surface defines a wire winding groove.

69. The apparatus according to claim 66 wherein the plurality of positioning teeth are disposed on an outer peripheral surface of the takeup element.

70. The apparatus according to claim 66 wherein the positioning pawl moves along the second path when the positioning unit rotates to at least one of the plurality of positions and the positioning pawl is in the engagement position.

71. The apparatus according to claim 70 further comprising a biasing member that biases the positioning pawl toward the engagement position.

72. The apparatus according to claim 71 wherein the positioning pawl comprises a mounting axle that engages an opening disposed with the mounting member, wherein the positioning pawl rotates around the mounting axle to move along the first path between the engagement position and the disengagement position.

73. The apparatus according to claim 72 wherein the opening is an elongated opening, and wherein the mounting axle moves within the elongated opening to move along the second path.

74. The apparatus according to claim 73 wherein the mounting opening is formed in the mounting member.

75. The apparatus according to claim 73 further comprising a release lever that moves the positioning pawl between the engagement position and the disengagement position.

76. The apparatus according to claim 58 wherein the positioning member moves along the second path when the positioning member is in the engagement position.

77. A bicycle control apparatus comprising:
   a mounting member adapted to be mounted to a bicycle;
   a positioning unit coupled to the mounting member for moving to a plurality of positions;
   a positioning member that maintains the positioning unit in each of the plurality of positions;
   wherein the positioning member moves along a first path between an engagement position,
where the positioning member engages the positioning unit, and a disengagement position where the positioning member is disengaged from the positioning unit;
   wherein the positioning member moves along a second path that is different from the first path;
   wherein movement of the positioning member along the second path includes movement of the positioning member other than rotation of the positioning member;
   wherein the positioning member rotates around an axis; and
   wherein the axis moves when the positioning member moves along the second path.

78. A bicycle control apparatus comprising:
   a mounting member adapted to be mounted to a bicycle;
   a positioning unit coupled to the mounting member for moving to a plurality of positions;
   a positioning member that maintains the positioning unit in each of the plurality of positions;
   wherein the positioning member moves along a first path between an engagement position,
where the positioning member engages the positioning unit, and a disengagement position where the positioning member is disengaged from the positioning unit;
   wherein the positioning member moves along a second path that is different from the first path;
   wherein movement of the positioning member along the second path includes movement of the positioning member other than rotation of the positioning member;
   wherein the positioning member includes a projection that engages a corresponding opening disposed with the mounting member; and
   wherein the positioning member rotates around the projection to move between the engagement position and the disengagement position.

* * * * *